(12) United States Patent
Yang et al.

(10) Patent No.: US 12,010,186 B2
(45) Date of Patent: Jun. 11, 2024

(54) SUPPORT OF INDIRECT COMMUNICATION WITH TLS

(71) Applicant: Telefonaktiebolaget LM Ericsson (publ), Stockholm (SE)

(72) Inventors: Yong Yang, Kållered (SE); Jesus-Angel de-Gregorio-Rodriguez, Madrid (ES); Yunjie Lu, Shanghai (CN)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 128 days.

(21) Appl. No.: 17/765,089

(22) PCT Filed: Sep. 30, 2020

(86) PCT No.: PCT/EP2020/077435
§ 371 (c)(1),
(2) Date: Mar. 30, 2022

(87) PCT Pub. No.: WO2021/064062
PCT Pub. Date: Apr. 8, 2021

(65) Prior Publication Data
US 2022/0385735 A1    Dec. 1, 2022

(51) Int. Cl.
*H04L 67/51*  (2022.01)
*H04L 67/02*  (2022.01)
*H04L 67/568* (2022.01)

(52) U.S. Cl.
CPC .............. *H04L 67/51* (2022.05); *H04L 67/02* (2013.01); *H04L 67/568* (2022.05)

(58) Field of Classification Search
CPC ............................ H04L 67/02; H04L 67/025
See application file for complete search history.

(56) References Cited

U.S. PATENT DOCUMENTS

2011/0137888 A1  6/2011  Yoo et al.
2013/0167193 A1  6/2013  Brookins et al.
(Continued)

FOREIGN PATENT DOCUMENTS

CN      104106073 A    10/2014
EP      2699049 A1     2/2014
(Continued)

OTHER PUBLICATIONS

Examination Report for European Patent Application No. 20789863.6, dated Dec. 8, 2022, 8 pages.
(Continued)

*Primary Examiner* — Clayton R Williams
(74) *Attorney, Agent, or Firm* — Withrow & Terranova, PLLC

(57) ABSTRACT

Disclosed herein is a method for indirect communication in a core network of a wireless communication system using a Service Communication Proxy, SCP, with Transport Layer Security, TLS, the method comprising: at a Network Function, NF, service consumer: sending, to the SCP, a Hypertext Transfer Protocol, HTTP, message that is intended for a first NF service producer instance, the HTTP message using a Fully Qualified Domain Name, FQDN, of the SCP and having a path that includes a query parameter set to a first value; and at the SCP: receiving the HTTP message from the NF service consumer; obtaining a HTTP response for the HTTP message; and sending the HTTP response to the NR service consumer; and at the NF service consumer: receiving the HTTP response from the SCP.

20 Claims, 10 Drawing Sheets

(56) References Cited

U.S. PATENT DOCUMENTS

| | | | |
|---|---|---|---|
| 2016/0315910 A1 | 10/2016 | Kaufman | |
| 2019/0306265 A1* | 10/2019 | Håkansson | H04L 67/1044 |
| 2019/0387430 A1* | 12/2019 | Ingerman | H04W 28/0231 |
| 2021/0168055 A1* | 6/2021 | Lair | H04L 67/51 |
| 2021/0321245 A1* | 10/2021 | Landais | H04W 8/06 |

FOREIGN PATENT DOCUMENTS

| | | |
|---|---|---|
| JP | 2001159998 A | 6/2001 |
| WO | 2016141549 A1 | 9/2016 |

OTHER PUBLICATIONS

Notice of Reasons for Refusal for Japanese Patent Application No. 2022-516224, dated Jun. 5, 2023, 8 pages.

Author Unknown, "Technical Specification Group Services and System Aspects; System Architecture for the 5G System (5GS); Stage 2 (Release 16)," Technical Specification 23.501, Version 16.2.0, Sep. 2019, 3GPP Organizational Partners, 391 pages.

Author Unknown, "Technical Specification Group Core Network and Terminals; 5G System; Technical Realization of Service Based Architecture; Stage 3 (Release 16)," Technical Specification 29.500, Version 16.1.0, Sep. 2019, 3GPP Organizational Partners, 43 pages.

Author Unknown, "Technical Specification Group Services and System Aspects; 3G security; Network Domain Security (NDS); IP network layer security (Release 16)," Technical Specification 33.210, Version 16.2.0, Jun. 2019, 3GPP Organizational Partners, 28 pages.

Dierks, et al., "The Transport Layer Security (TLS) Protocol," Request for Comments 5246, Version 1.2, Aug. 2008, 104 pages.

Fielding, et al., "Hypertext Transfer Protocol (HTTP/1.1): Caching," Request for Comments 7234, Jun. 2014, 43 pages.

Rescorla, "The Transport Layer Security (TLS) Protocol," Request for Comments 8446, Version 1.3, Aug. 2018, 160 pages.

Ericsson, "C4-194abc: Discussion Paper on Routing Mechanism for Indirect Communication is SBA," 3GPP TSG-CT WG4 Meeting #94, Oct. 7-11, 2019, Portoroz, Slovenia, 2 pages.

Rescorla, et al., "Datagram Transport Layer Security Version 1.2," Request for Comments 6347, Version 1.2, Jan. 2012, 32 pages.

International Search Report and Written Opinion for International Patent Application No. PCT/EP2020/077435, dated Dec. 2, 2020, 12 pages.

Author Unknown, "Technical Specification Group Core Network and Terminals; 5G System; Common Data Types for Service Based Interfaces; Stage 3 (Release 16)," Technical Specification 29.571, Version 16.1.0, Sep. 2019, 3GPP Organizational Partners, 83 pages.

Fielding, et al., "Hypertext Transfer Protocol (HTTP/1.1): Message Syntax and Routing," Request for Comments 7230, Jun. 2014, Internet Engineering Task Force, 89 pages.

First Office Action for Chinese Patent Application No. 202080069034.X, dated Oct. 20, 2023, 20 pages.

\* cited by examiner

SUPPORT OF INDIRECT COMMUNICATION WITH TLS

This application is a 35 U.S.C. § 371 national phase filing of International Application No. PCT/EP2020/077435, filed Sep. 30, 2020, which claims the benefit of International Application No. PCT/CN2019/109785, filed Oct. 1, 2019, the disclosures of which are incorporated herein by reference in their entireties.

TECHNICAL FIELD

The present disclosure relates to indirection communication between Network Functions (NFs) in a core network of a wireless communication system (e.g., in a Fifth Generation Core (5GC)).

BACKGROUND

FIG. 1

FIG. 1 depicts the Third Generation Partnership Project (3GPP) Fifth Generation (5G) reference architecture. In the 5G Core (5GC), the indirect communication model in the Service Based Architecture (SBA) requires that the Network Function (NF) service consumer sends its service requests towards an entity called Service Communication Proxy (SCP) which, in turn, will issue a new service request towards the target NF service producer. The following aspects are also applicable:

The service request from the NF service consumer, when protected with Transport Layer Security (TLS), shall terminate the TLS connection at the SCP.

The SCP may be required to cache previous responses towards the NF service consumer.

Specifically, as described in 3GPP Technical Specification (TS) 23.501 V16.2.0:

If an SCP is deployed, the SCP can be used for indirect communication between NFs and NF services as described in Annex E. SCP does not expose services itself.

Annex E (informative) of 3GPP TS 23.501 V16.2.0 is as follows:

E.1 General
This annex provides a high level description of the different communication models that NF and NF services can use to interact which each other. Table E.1-1 summarizes the communication models, their usage and how they relate to the usage of an SCP.
Table E.1-1: Communication models for NF/NF services interaction summary

| Communication between consumer and producer | Service discovery and request routing | Communication model |
|---|---|---|
| Direct communication | No NRF or SCP; direct routing | A |
|  | Discovery using NRF services; no SCP; direct routing | B |
| Indirect communication | Discovery using NRF services; selection for specific instance from the Set can be delegated to SCP. Routing via SCP | C |
|  | Discovery and associated selection delegated to an SCP using discovery and selection parameters in service request; routing via SCP | D |

Model A - Direct communication without NRF interaction: Neither NRF nor SCP are used. Consumers are configured with producers' "NF profiles" and directly communicate with a producer of their choice.
Model B - Direct communication with NRF interaction: Consumers do discovery by querying the NRF. Based on the discovery result, the consumer does the selection. The consumer sends the request to the selected producer.
Model C - Indirect communication without delegated discovery: Consumers do discovery by querying the NRF. Based on discovery result, the consumer does the selection of an NF Set or a specific NF instance of NF instance set. The consumer sends the request to the SCP containing the address of the selected service producer pointing to a NF service instance or a set of NF service instances. In the latter case, the SCP selects an NF Service instance. If possible, the SCP interacts with NRF to get selection parameters such as location, capacity, etc. The SCP routes the request to the selected NF service producer instance.
Model D - Indirect communication with delegated discovery: Consumers do not do any discovery or selection. The consumer adds any necessary discovery and selection parameters required to find a suitable producer to the service request. The SCP uses the request address and the discovery and selection parameters in the request message to route the request to a suitable producer instance. The SCP can perform discovery with an NRF and obtain a discovery result.
FIG. E.1-1 depicts the different communication models.
[REPRODUCED AS FIG. 2]
FIG. E.1-1: Communication models for NF/NF services interaction As specified in 3GPP TS 33.210 V16.2.0, TLS 1.2 shall be supported. Specifically, Section 6.2.1 of 3GPP TS 33.210 V16.2.0 states:

| TLS versions |
| --- |
| - SSL 1.0, SSL 2.0, SSL 3.0, TLS 1.0, TLS 1.1 [67] and DTLS 1.0 shall not be supported.<br>- TLS 1.2 as specified in RFC 5246 [50] shall be supported. TLS 1.3 as specified in RFC 8446 [66] shall be supported. If DTLS is supported then DTLS 1.2 as specified in RFC 6347 [49] shall be supported. |

To support communication between a service consumer and a service producer, where at least a SCP may be deployed in between and TLS is used, the TLS association is to be established between the service consumer and the SCP.

3GPP has introduced a 3GPP specific custom Hypertext Transfer Protocol (HTTP) header "3gpp-Sbi-Target-api-Root" which is set the Uniform Resource Indicator (URI) of the service producer, i.e. for indirect communication with or without delegated discovery, the HTTP client is to include a 3gpp-Sbi-Target-apiRoot header set to the apiRoot of an authority server for the target resource, if available, in requests it sends to the SCP. In other words, it has been agreed that the NF service consumer would convey to the SCP the Application Program Interface (API) root (HTTP schema+ authority+API prefix) of the target NF service producer in the HTTP header called 3gpp-Sbi-Target-api-Root.

SUMMARY

The introduction of "3gpp-Sbi-Target-apiRoot" leads to a potential caching problem, as described below. Internet Engineering Task Force (IETF) Request for Comment (RFC) 7234 specifies that the primary cache key consists of a request method and a target Uniform Resource Indicator (URI). When presented with a request, a cache must not reuse a stored response, unless the presented effective request URI and that of the stored response match. For example:

A consumer Network Function (NF) (e.g., Access and Mobility Function (AMF)) that sends a request to a producer NF (e.g., Unified Data Management (UDM)) may need to send:
GET https://udm1.operator.com/nudm_sdm/v1/{supi}/nssai Then, if the AMF is configured to use a Service Communication Proxy (SCP) with Transport Layer Security (TLS), the AMF sends the request to the SCP:
GET https://scp.operator.com/nudm_sdm/v1/{supi}/nssai
3gpp-Sbi-Target-apiRoot: https://udm1.operatorcom This will have the problem of requests sent to UDM1 and UDM2 being identical, from the cache perspective.

In other words, during the CT4 #93 meeting, it was proposed that the NF service consumer would set the authority of the Hypertext Transfer Protocol (HTTP) request towards the SCP as the Fully Qualified Domain Name (FQDN)+port of the SCP. This was regarded as problematic since several requests towards different NF service consumers could result into identical HTTP requests towards the SCP, which would make the caching of responses not feasible.

One proposal for addressing this problem is to set the authority of the HTTP request as:

<Label Representing the Target FQDN>.<FQDN of the SCP>

Given that the cache keys are typically based on the full URI, including the authority part, this solves the issue of collisions between cached responses. Continuing the example from above, one example would be:
GET https://label1.scp.operator.com/nudm_sdm/v1/{supi}/nssai
3gpp-Sbi-Target-apiRoot: https://udm1.operatorcom The SCP builds the cache towards consumers based on https://label1.scp.operator.com/nudm_sdm/v1/{supi}/nssai. Then, the SCP removes label1, and sends the request to https://udm1.operator.com/nudm_sdm/v1/{supi}/nssai, as originally intended. The service consumer, e.g. the AMF in this case, uses a different "label1" to differentiate the response from UDM1 and UDM2.

However, the above proposal has the following problems. Assuming that the AMF has implemented a standard HTTP protocol stack:

1. The Domain Name System (DNS) infrastructure of the operator must be configured such that all addresses in the form of *.<FQDN of the SCP> are resolved to the Internet Protocol (IP) address of the SCP. In other words, when the HTTP protocol stack receives: authority=label1.scp.operator.com, it will perform a DNS procedure to retrieve the IP address of the SCP. This requires a wildcard DNS record for the SCP, i.e. *.scp.operator.com, to be configured in the DNS server.
2. The SCP must present a wildcard certificate matching the domains *.<FQDN of the SCP>. In other words, since ":scheme"="https", the service consumer needs to establish a TLS association with the SCP. If TLS 1.2 is used, in the "server hello" message, the SCP needs to provide the server's public key and its certificate, where such certificate and public key are for the SCP's FQDN (scp.operator.com) and not for "label1scp.operatorcom". It is an even worse idea to associate the certificate with the SCP IP address directly, as it is required that the IP address shall be a public IP address, and it is quite often to use private IP address in an operator network. In addition, in a cloud environment, the NF may be dynamically instantiated and be assigned with an IP address. So, it is required to use DNS, using FQDN of SCP, to resolve the corresponding IP address.

Embodiments of an alternative solution are disclosed herein. In Fifth Generation (5G) Core (5GC), where a service consumer needs to communicate with a service producer via a SCP using TLS, the service consumer includes a query parameter, preferably called "cache key" or simply "ck", in the ":path". The value of the ck query parameter is set to a value that is associated with (i.e., linked to) the target NF service producer (e.g., associated with (e.g., linked to) the FQDN of the target NF service producer). For example, continuing the example above, the solution would be:

The AMF constructs the GET request as below, and sends it to the SCP:
GET https://scp.operator.com/nudm_sdm/v1/{supi}/nssai?ck=value1
3gpp-Sbi-Target-apiRoot: https://udm1.operatorcom The service consumer, i.e. the AMF, builds the cache towards consumers based on:
https://scp.operator.com/nudm_sdm/v1/{supi}/nssai?ck=value1.

The SCP may remove the query parameter, and sends the request to
https://udm1.operator.com/nudm_sdm/v1/{supi}/nssai,
as originally intended.

Different values are assigned to the ck query parameter to differentiate the responses from different target NF service producers.

The proposed solution solves the caching problem when a service consumer is to communicate with a service producer via a SCP with TLS.

One embodiment is directed to a method for indirect communication in a core network of a wireless communication system using a Service Communication Proxy (SCP) with Transport Layer Security (TLS), the method comprising: at a Network Function (NF) service consumer: sending, to the SCP, a Hypertext Transfer Protocol (HTTP) message that is intended for a first NF service producer instance, the HTTP message using a Fully Qualified Domain Name (FQDN) of the SCP and having a path that includes a query parameter set to a first value; and at the SCP: receiving the HTTP message from the NF service consumer; obtaining a HTTP response for the HTTP message; and sending the HTTP response to the NR service consumer; and at the NF service consumer: receiving the HTTP response from the SCP.

BRIEF DESCRIPTION OF THE DRAWINGS

The accompanying drawing figures incorporated in and forming a part of this specification illustrate several aspects of the disclosure, and together with the description serve to explain the principles of the disclosure.

DETAILED DESCRIPTION

Figure 1:
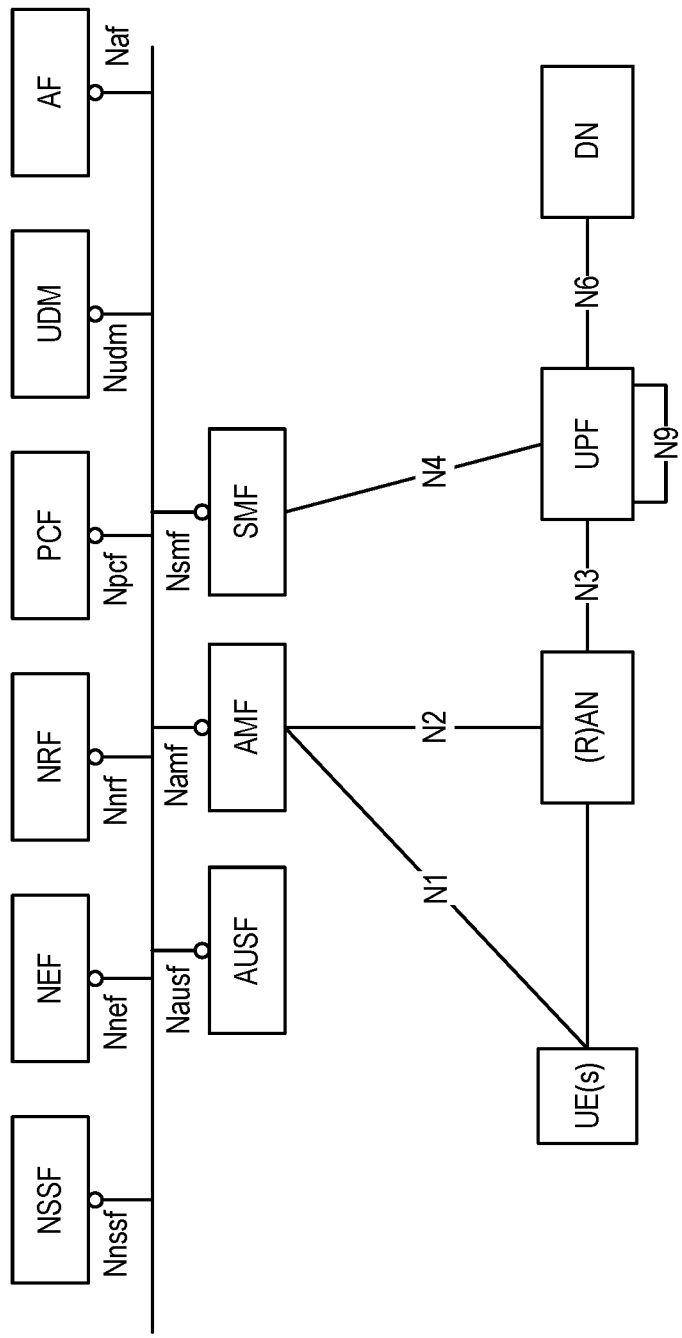
FIG. 1 illustrates the Fifth Generation (5G) Core (5GC) reference architecture.
Figure 2:
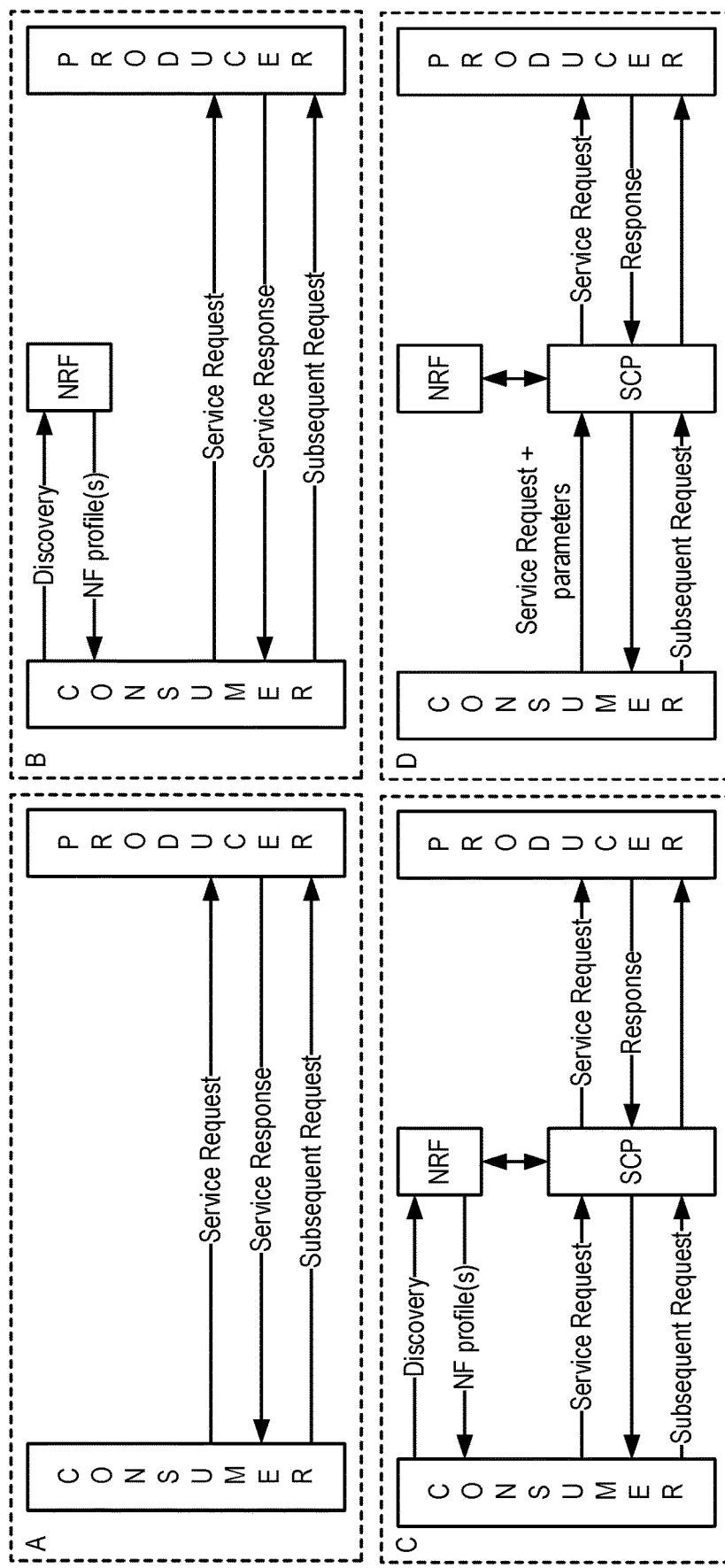
FIG. 2 is a reproduction of Figure E.1-1 of Annex E of Third Generation Partnership Project (3GPP) Technical Specification (TS) 23.501 V16.2.0.

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure.

Radio Node: As used herein, a "radio node" is either a radio access node or a wireless device.

Radio Access Node: As used herein, a "radio access node" or "radio network node" is any node in a radio access network of a cellular communications network that operates to wirelessly transmit and/or receive signals. Some examples of a radio access node include, but are not limited to, a base station (e.g., a New Radio (NR) base station (gNB) in a Third Generation Partnership Project (3GPP) Fifth Generation (5G) NR network or an enhanced or evolved Node B (eNB) in a 3GPP Long Term Evolution (LTE) network), a high-power or macro base station, a low-power base station (e.g., a micro base station, a pico base station, a home eNB, or the like), and a relay node.

Core Network Node: As used herein, a "core network node" is any type of node in a core network or any node that implements a core network function. Some examples of a core network node include, e.g., a Mobility Management Entity (MME), a Packet Data Network Gateway (P-GW), a Service Capability Exposure Function (SCEF), a Home Subscriber Server (HSS), or the like. Some other examples of a core network node include a node implementing a Access and Mobility Function (AMF), a User Plane Function (UPF), a Session Management Function (SMF), an Authentication Server Function (AUSF), a Network Slice Selection Function (NSSF), a Network Exposure Function (NEF), a Network Function (NF) Repository Function (NRF), a Policy Control Function (PCF), a Unified Data Management (UDM), or the like.

Wireless Device: As used herein, a "wireless device" is any type of device that has access to (i.e., is served by) a cellular communications network by wirelessly transmitting and/or receiving signals to a radio access node(s). Some examples of a wireless device include, but are not limited to, a User Equipment device (UE) in a 3GPP network and a Machine Type Communication (MTC) device.

Network Node: As used herein, a "network node" is any node that is either part of the radio access network or the core network of a cellular communications network/system.

Note that the description given herein focuses on a 3GPP cellular communications system and, as such, 3GPP terminology or terminology similar to 3GPP terminology is oftentimes used. However, the concepts disclosed herein are not limited to a 3GPP system.

Note that, in the description herein, reference may be made to the term "cell"; however, particularly with respect to 5G NR concepts, beams may be used instead of cells and, as such, it is important to note that the concepts described herein are equally applicable to both cells and beams.

Embodiments of a solution for indirect communication between a NF service consumer and a NF service consumer using a Service Communication Proxy (SCP) with Transport Layer Security (TLS) are disclosed herein. In 5G Core (5GC), where a service consumer needs to communicate with a service producer via a SCP using TLS, the service consumer includes an query parameter, preferably called "cache key" or simply "ck", in the ":path". The value of the ck query parameter is set to a value that is associated with (i.e., linked to) the target NF service producer (e.g., associated with (e.g., linked to) the Fully Qualified Domain Name (FQDN) of the target NF service producer).

Some aspects applicable to this ck query parameter are:
  It will be used by the cache system in the SCP, in order to distinguish cache objects. This is a typical feature found in caches (see [1]).
  It can contain a short, compact value calculated in different ways (implementation specific) but, for example, it can be a 40-bit truncation of the Secure Hash Algorithm 1 (SHA-1) hash of the whole Application Program Interface (API) root of the target NF service producer (same value as included in the 3gpp-Sbi-Target-ApiRoot header).
    Note: The probability of collision [2], among a number of 1500 hosts/FQDNs, using 40-bit hashes is approximately $10^{-6}$,
  The value is bound to a given apiRoot (i.e., the same API root produces the same value for the content of ck).
  The query parameter ck is used by the SCP, and is not sent to the actual NF service producer, given that it is not part of the actual service definition. It is proposed to not document it in OpenAPI definitions of service producers.

Example: The AMF needs to send a GET request to the UDM to the following Uniform Resource Identifiers (URIs):
  1. https://udm1.operator.com/api-prefix/nudm-sdm/v1/{supi}/nssai
  2. https://udm2.operator.com/api-prefix/nudm-sdm/v1/{supi}/nssai via:
    https://scp.operator.com:8080/The
The requests are then sent to the SCP as follows:
  1. GET https://scp.operator.com:8080/nudm-sdm/v1/{supi}/nssai?ck=47A319D0F9 Accept: application/json
    3gpp-Sbi-Target-ApiRoot: https://udm1.operator.com/api-prefix
  2. GET https://scp.operator.com:8080/nudm-sdm/v1/{supi}/nssai?ck=2F367503F4
    Accept: application/json
    3gpp-Sbi-Target-ApiRoot: https://udm2.operator.com/api-prefix
This example shows how those two requests, that would have been otherwise identical, are now differentiated by the inclusion of the ck query parameter. When the cache system is configured to use such parameter as an additional key, it can differentiate between responses to be reused towards NF service consumers.

FIG. 3

Figure 3:
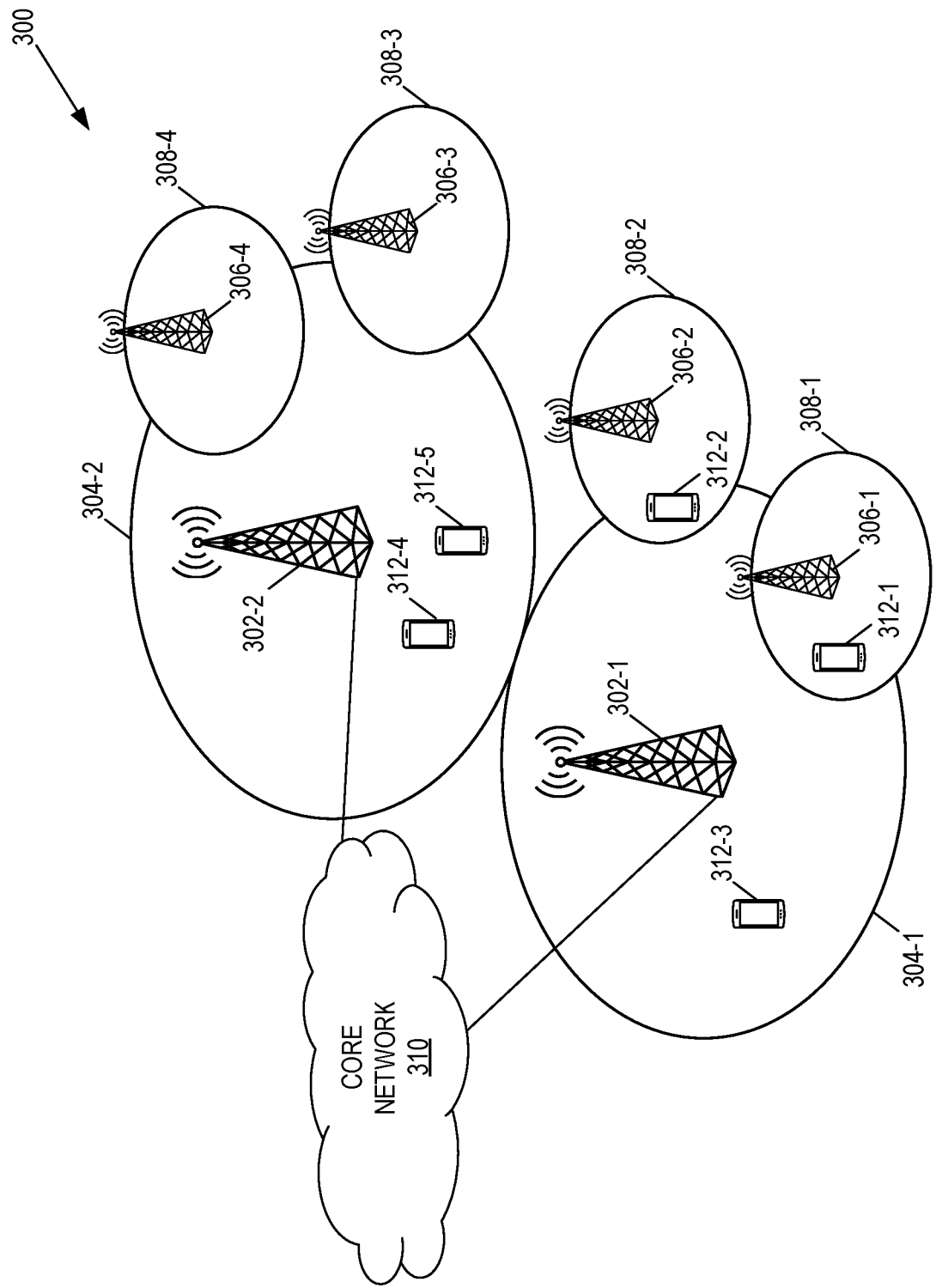
FIG. 3 illustrates one example of a cellular communications network according to some embodiments of the present disclosure.

FIG. 3 illustrates one example of a cellular communications system 300 in which embodiments of the present disclosure may be implemented. In the embodiments described herein, the cellular communications system 300 is a 5G System (5GS) including a NR Radio Access Network (RAN) or LTE RAN (i.e., Evolved Universal Terrestrial Radio Access (E-UTRA) RAN). In this example, the RAN includes base stations 302-1 and 302-2, which in 5G are referred to as gNBs or LTE RAN nodes connected to 5GC (which are referred to as gn-eNBs), controlling corresponding (macro) cells 304-1 and 304-2. The base stations 302-1 and 302-2 are generally referred to herein collectively as base stations 302 and individually as base station 302. Likewise, the (macro) cells 304-1 and 304-2 are generally referred to herein collectively as (macro) cells 304 and individually as (macro) cell 304. The RAN may also include a number of low power nodes 306-1 through 306-4 controlling corresponding small cells 308-1 through 308-4. The low power nodes 306-1 through 306-4 can be small base stations (such as pico or femto base stations) or Remote Radio Heads (RRHs), or the like. Notably, while not illustrated, one or more of the small cells 308-1 through 308-4 may alternatively be provided by the base stations 302. The low power nodes 306-1 through 306-4 are generally referred to herein collectively as low power nodes 306 and individually as low power node 306. Likewise, the small cells 308-1 through 308-4 are generally referred to herein collectively as small cells 308 and individually as small cell 308. The cellular communications system 300 also includes a core network 310, which in the 5GS is referred to as the 5GC. The base stations 302 (and optionally the low power nodes 306) are connected to the core network 310.

The base stations 302 and the low power nodes 306 provide service to wireless devices 312-1 through 312-5 in the corresponding cells 304 and 308. The wireless devices 312-1 through 312-5 are generally referred to herein collectively as wireless devices 312 and individually as wireless device 312. The wireless devices 312 are also sometimes referred to herein as UEs.

FIG. 4

Figure 4:
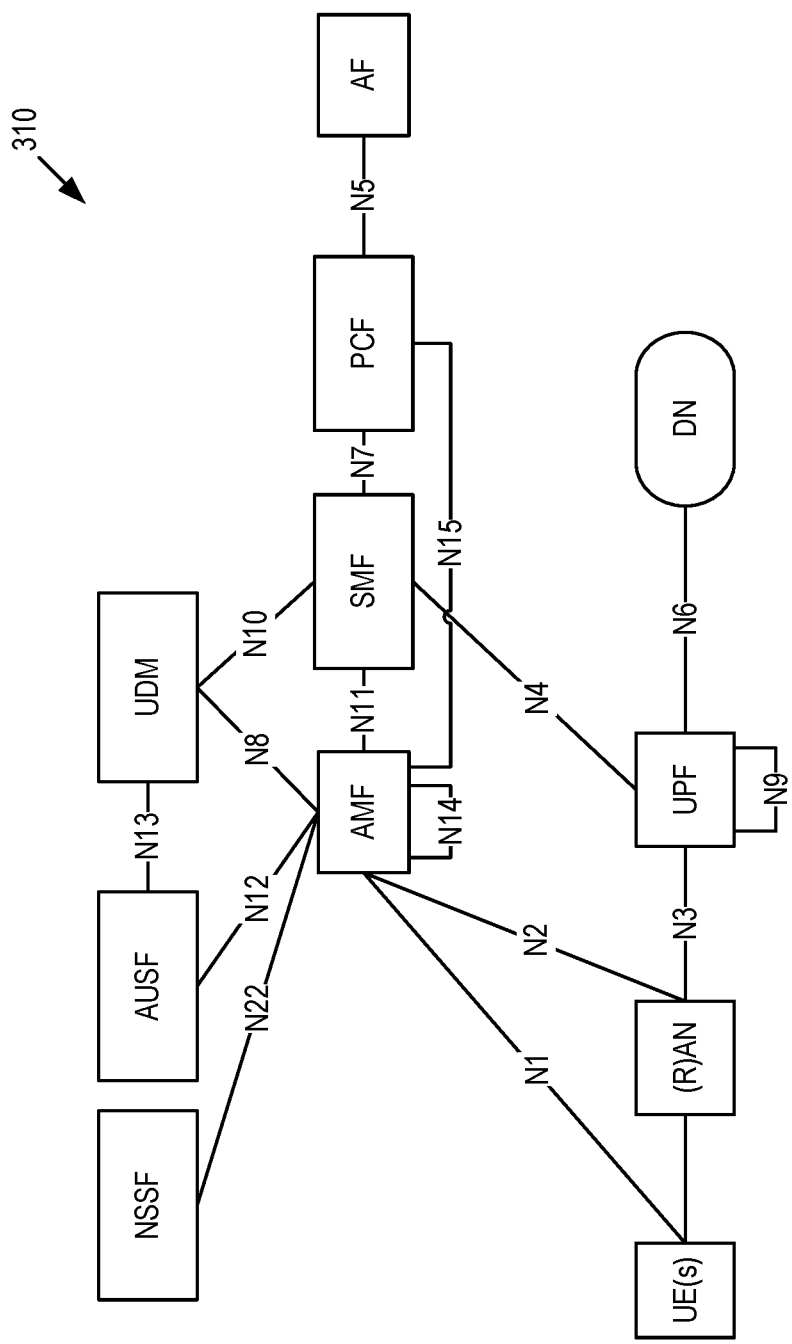
FIGS. 4 and 5 illustrate example representations of the 5GC of FIG. 3.

FIG. 4 illustrates a wireless communication system represented as a 5G network architecture composed of core NFs, where interaction between any two NFs is represented by a point-to-point reference point/interface. FIG. 4 can be viewed as one particular implementation of the system 300 of FIG. 3.

Seen from the access side the 5G network architecture shown in FIG. 4 comprises a plurality of UEs connected to either a RAN or an Access Network (AN) as well as an AMF. Typically, the (R)AN comprises base stations, e.g. such as eNBs or gNBs or similar. Seen from the core network side, the 5G core NFs shown in FIG. 4 include a NSSF, an AUSF, a UDM, an AMF, a SMF, a PCF, and an Application Function (AF).

Reference point representations of the 5G network architecture are used to develop detailed call flows in the normative standardization. The N1 reference point is defined to carry signaling between the UE and AMF. The reference points for connecting between the AN and AMF and between the AN and UPF are defined as N2 and N3, respectively. There is a reference point, N11, between the AMF and SMF, which implies that the SMF is at least partly controlled by the AMF. N4 is used by the SMF and UPF so that the UPF can be set using the control signal generated by the SMF, and the UPF can report its state to the SMF. N9 is the reference point for the connection between different UPFs, and N14 is the reference point connecting between different AMFs, respectively. N15 and N7 are defined since the PCF applies policy to the AMF and SMP, respectively. N12 is required for the AMF to perform authentication of the UE. N8 and N10 are defined because the subscription data of the UE is required for the AMF and SMF.

The 5GC network aims at separating user plane and control plane. The user plane carries user traffic while the control plane carries signaling in the network. In FIG. 4, the UPF is in the user plane and all other NFs, i.e., the AMF, SMF, PCF, AF, AUSF, and UDM, are in the control plane. Separating the user and control planes guarantees each plane resource to be scaled independently. It also allows UPFs to be deployed separately from control plane functions in a distributed fashion. In this architecture, UPFs may be deployed very close to UEs to shorten the Round Trip Time (RTT) between UEs and data network for some applications requiring low latency.

The core 5G network architecture is composed of modularized functions. For example, the AMF and SMF are independent functions in the control plane. Separated AMF and SMF allow independent evolution and scaling. Other control plane functions like the PCF and AUSF can be separated as shown in FIG. 4. Modularized function design enables the 5GC network to support various services flexibly.

Each NF interacts with another NF directly. It is possible to use intermediate functions to route messages from one NF to another NF. In the control plane, a set of interactions between two NFs is defined as service so that its reuse is possible. This service enables support for modularity. The user plane supports interactions such as forwarding operations between different UPFs.

FIG. 5

Figure 5:
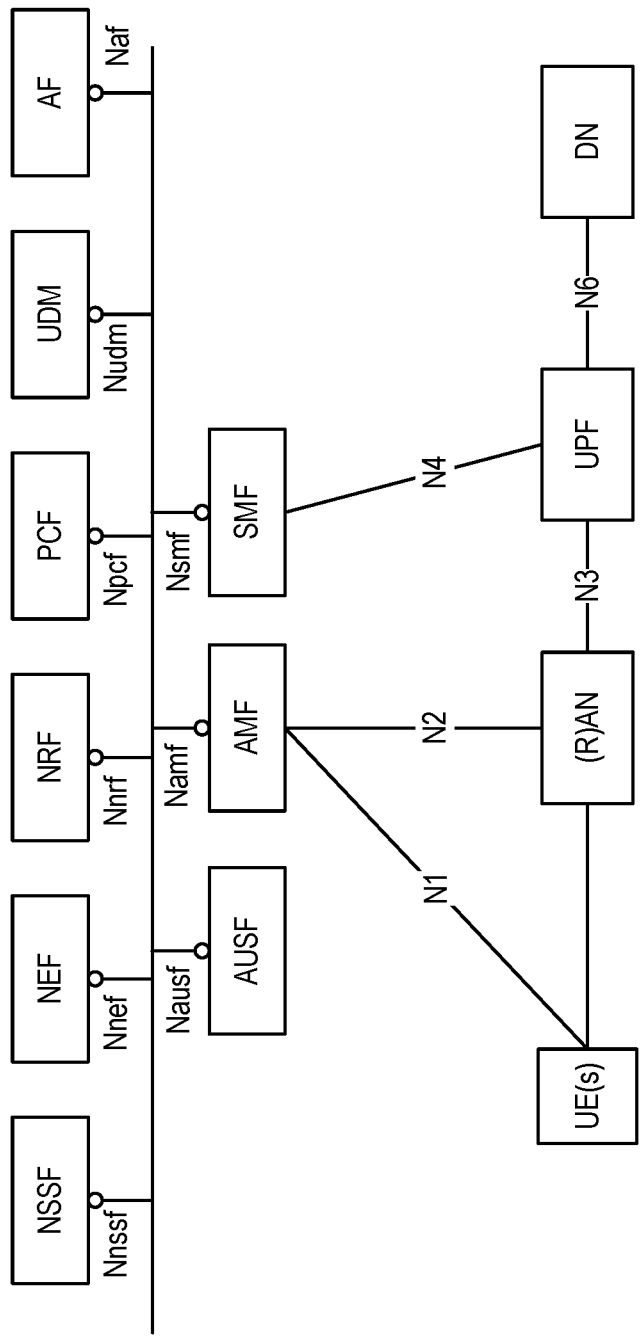

FIG. 5 illustrates a 5G network architecture using service-based interfaces between the NFs in the control plane, instead of the point-to-point reference points/interfaces used in the 5G network architecture of FIG. 4. However, the NFs described above with reference to FIG. 4 correspond to the NFs shown in FIG. 5. The service(s) etc. that a NF provides to other authorized NFs can be exposed to the authorized NFs through the service-based interface. In FIG. 5 the service based interfaces are indicated by the letter "N" followed by the name of the NF, e.g. Namf for the service based interface of the AMF and Nsmf for the service based interface of the SMF etc. The NEF and the NRF in FIG. 5 are not shown in FIG. 4 discussed above. However, it should be clarified that all NFs depicted in FIG. 4 can interact with the NEF and the NRF of FIG. 5 as necessary, though not explicitly indicated in FIG. 4.

Some properties of the NFs shown in FIGS. 4 and 5 may be described in the following manner. The AMF provides UE-based authentication, authorization, mobility management, etc. A UE even using multiple access technologies is basically connected to a single AMF because the AMF is independent of the access technologies. The SMF is responsible for session management and allocates Internet Protocol (IP) addresses to UEs. It also selects and controls the UPF for data transfer. If a UE has multiple sessions, different SMFs may be allocated to each session to manage them individually and possibly provide different functionalities per session. The AF provides information on the packet flow to the PCF responsible for policy control in order to support Quality of Service (QoS). Based on the information, the PCF determines policies about mobility and session management to make the AMF and SMF operate properly. The AUSF supports authentication function for UEs or similar and thus stores data for authentication of UEs or similar while the UDM stores subscription data of the UE. The Data Network (DN), not part of the 5GC network, provides Internet access or operator services and similar.

An NF may be implemented either as a network element on a dedicated hardware, as a software instance running on a dedicated hardware, or as a virtualized function instantiated on an appropriate platform, e.g., a cloud infrastructure.

FIG. 6

Figure 6:
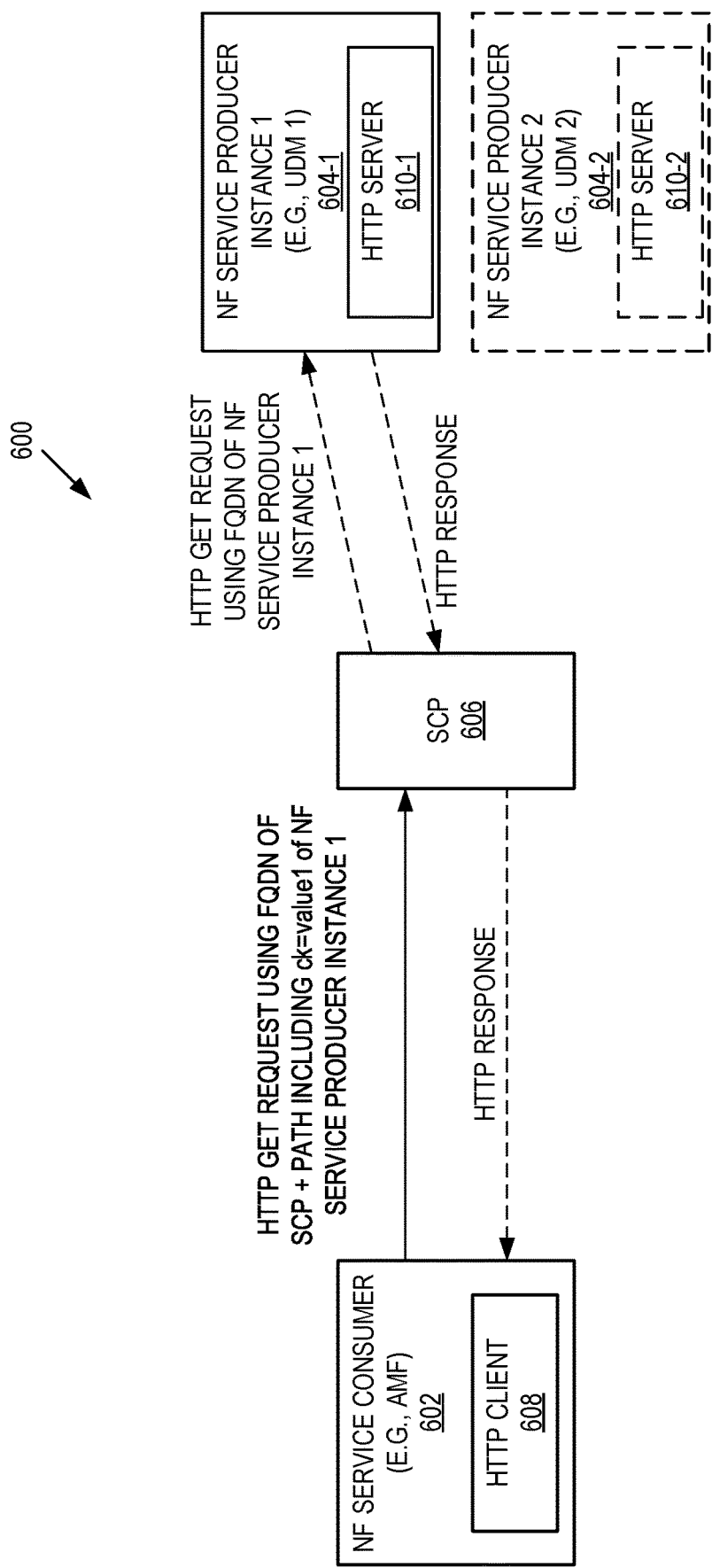
FIG. 6 illustrates indirect communication between a Network Function (NF) service consumer and a NF service producer using a Service Communication Proxy (SCP) with Transport Layer Security (TLS) in accordance with embodiments of the present disclosure.

FIG. 6 illustrates a system 600 for indirect communication between a NF service consumer 602 (e.g., an AMF) and a NF service producer (e.g., a UDM), represented by a first NF service producer instance 604-1 (also referred to herein as NF service producer instance 1) via a SCP 606 using TLS. Indirect communication via the SCP 606 using TLS may also be provided between the NF service consumer 602 and one or more additional instances of the NF service producer (e.g., an NF service producer instance 604-2, which is also referred to herein as NF service producer instance 2). The NF service consumer 602 includes a Hypertext Transfer Protocol (HTTP) client 608. The NF service producer instances 604-1 and 604-2 include HTTP servers 610-1 and 610-2, respectively.

Figure 7A:
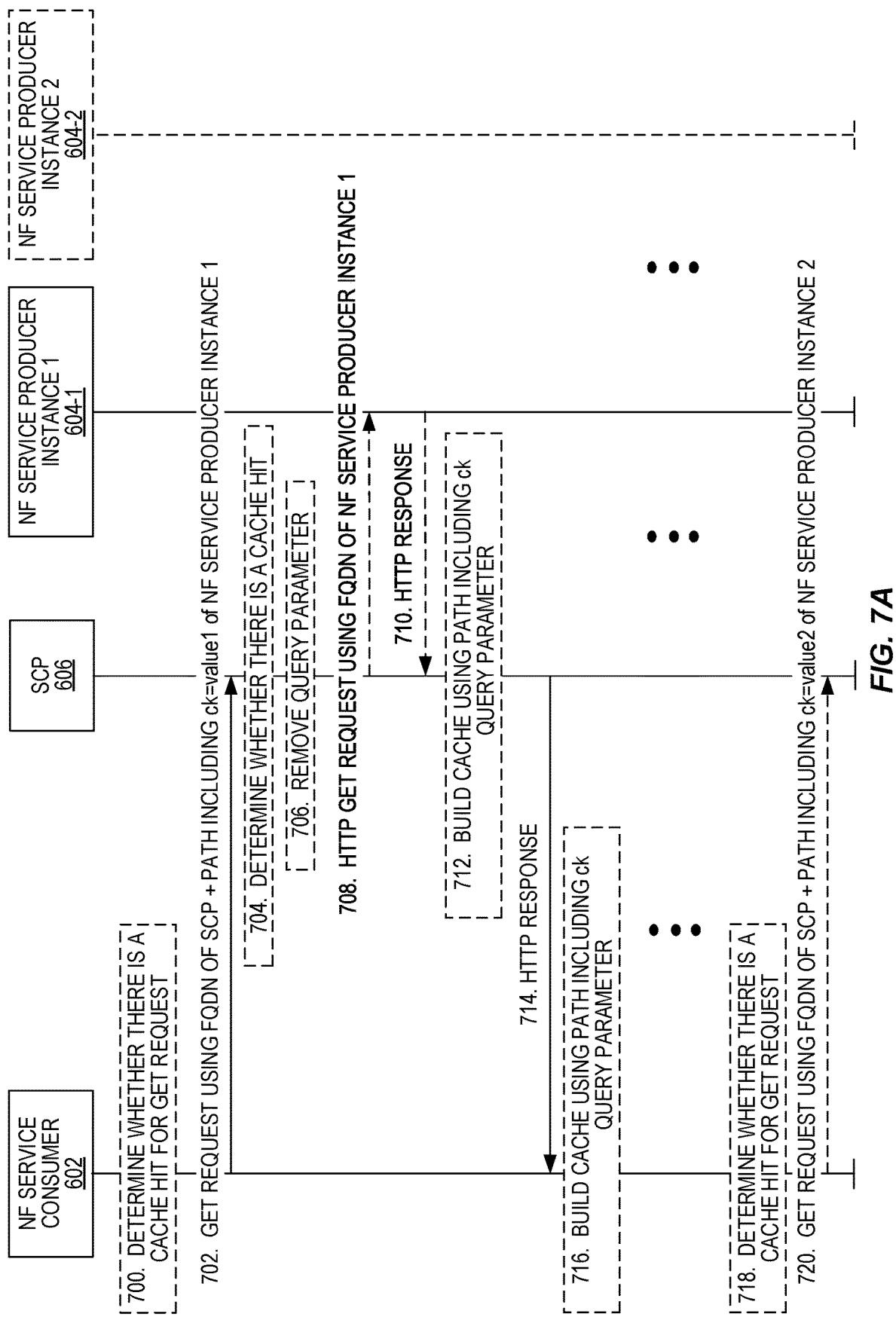
FIGS. 7A and 7B illustrate the operation of the NF service consumer, SCP, and NF service producer instance(s) of FIG. 6 in accordance with embodiments of the present disclosure.
Figure 7B:
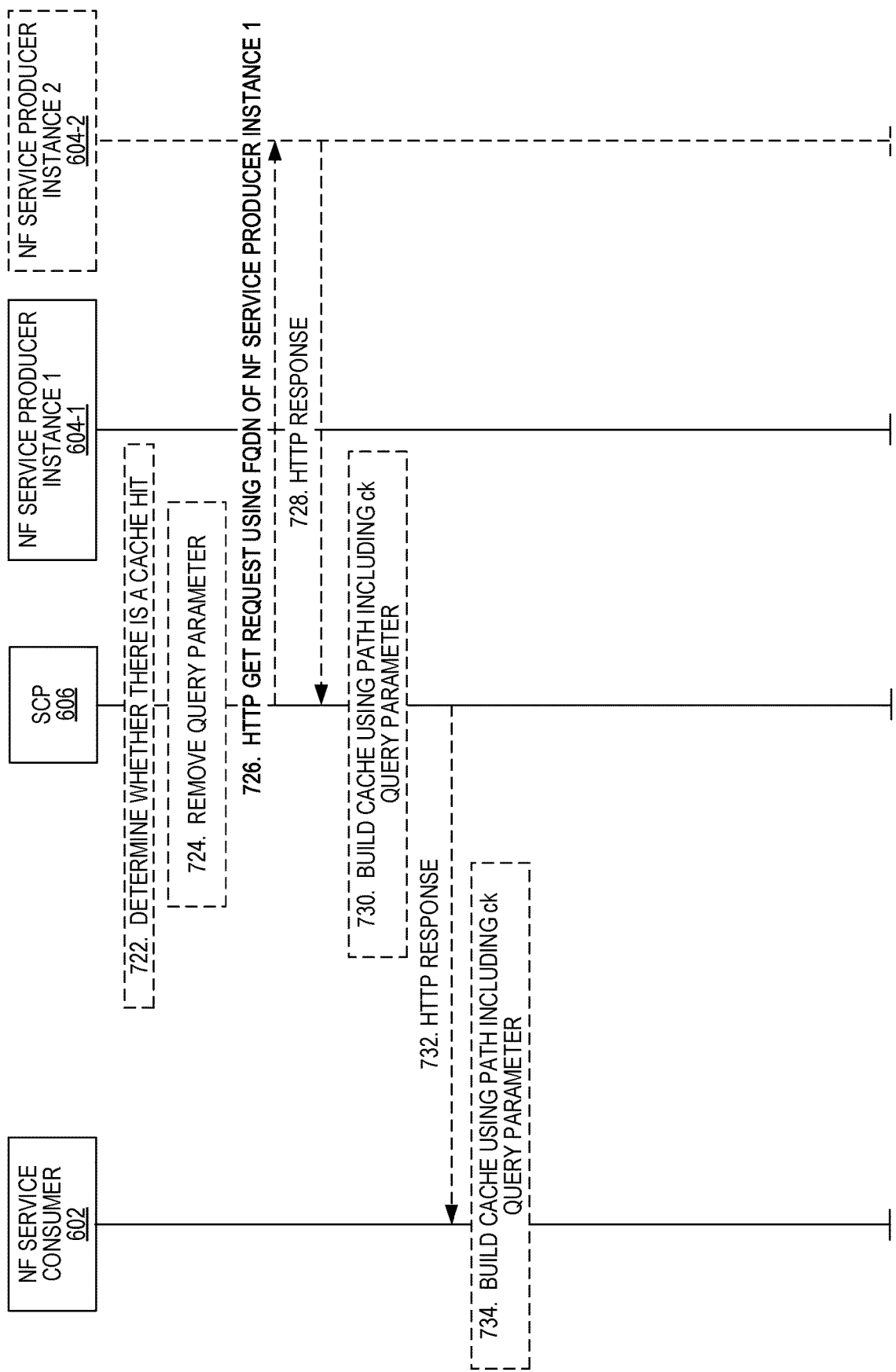

FIGS. 7A and 7B

FIGS. 7A and 7B illustrates the operation of the system 600 in accordance with embodiments of the present disclosure. Optional steps are represented by dashed lines or dashed boxes. Note that while this example uses the HTTP GET request, the query parameter discussed below can be used with any HTTP message (e.g., HTTP GET, HTTP POST, HTTP PUT, HTTP DELETE, etc.).

In some embodiments, the NF service consumer 602 builds and maintains a cache in an associated caching system. The cache uses the ck query parameter as described herein. In the illustrated example, the NF service consumer 602 desires to send an HTTP GET request to the first NF service producer instance 604-1 via the SCP 606. In embodiments in which the NF service consumer 602 builds and maintains a cache, the NF service consumer 602 uses a query parameter, referred to herein as "cache key" or simply "ck", set to a value (referred to in this example as "value1") associated with the NF service producer instance 604-1 to determine whether there is a hit in the associated caching system for the HTTP GET request (step 700). If there is a hit, the NF service consumer 602 obtains an HTTP response for the HTTP GET request from the associated cache system; otherwise, the NF service consumer 602 sends the HTTP GET request to the SCP 606 as described below.

When no caching is implemented at the NF service consumer 602 or when caching is implemented at the NF service consumer 602 but there is a cache miss, the NF service consumer 602 (more specifically the HTTP client 608) sends the HTTP GET request to the SCP 606 using a FQDN of the SCP 606 and a path that includes the ck query parameter set to a value ("value1") of the NF service producer instance 604-1 (step 702). The HTTP client 608 also includes a 3gpp-Sbi-Target-apiRoot header set to the apiRoot containing the authority component of the URIs of the server for the target resource, which in this case is that of the NF service producer instance 604-1. For example, assuming that the NF service consumer 602 is an AMF and the NF service producer instance 604-1 is a UDM instance (UDM1), the GET request may be, e.g.:

GET https://scp.operator.com:8080/nudm-sdm/v1/{supi}/nssai?ck=47A319D0F9
Accept: application/json
3gpp-Sbi-Target-ApiRoot: https://udm1.operator.com/api-prefix Note that the value of the ck query parameter can be calculated or otherwise determined using any suitable mechanism that associates the value to the FQDN (or apiRoot) of the NF servicer consumer instance. For example, the value may be computed as a hash (e.g., SHA-1)

of the apiRoot, and then potentially truncated to fewer bits than the full length of the hash (e.g., for efficiency). Of course, other ways of calculating the value of the ck query parameter can be used as long as the value is associated with (e.g., linked to) the NF service producer instance.

In some embodiments, the SCP 606 builds and maintains a cache in an associated cache system using the query parameter. If the SCP 606 does build and maintain a cache, the SCP 606 determines whether there is a cache hit (i.e., a matching cache object) for the GET request using the ck query parameter (step 704). If the SCP 606 does not have a previous response to this GET request (i.e., a matching cache objected) cached in its cache system (where the ck query parameter is used by the cache system to distinguish cache objects) (i.e., if there is a cache miss), the SCP 606 optionally removes the ck parameter from the path (step 706) and forwards the HTTP GET request to the NF service producer instance 604-1 using a FQDN of the NF service producer instance 1 (step 708). Continuing the example from above, the SCP 606 sends the following GET request to UDM1:

https://udm1.operator.com/api-prefix/nudm-sdm/v1/ {supi}/nssai

The NF service producer instance 604-1 sends a corresponding HTTP response to the SCP 606 (step 710). The SCP 606 caches the HTTP response using the ck query parameter (e.g., as part of the key of the corresponding cache object in the cache system) (step 712).

Returning to step 704, if upon receiving the HTTP GET request in step 702 the SCP 606 determines that there is a cache hit (i.e., there is a matching cache object stored in its cache system), the SCP 606 obtains the HTTP response from its associated cache rather than from the NF service producer instance 604-1 (i.e., no need to forward the request to and receive the response from the NF service producer instance 604-1).

Note that if caching is not implemented at the SCP 606, upon receiving the HTTP GET request in step 702, the SCP 606 optionally removes the ck parameter from the path (step 706) and forwards the HTTP GET request to the NF service producer instance 604-1 using a FQDN of the NF service producer instance 1 (step 708) (i.e., does not need to check for a cache hit before sending the HTTP GET request to the first NF service producer instance 604-1).

Once the SCP 606 has obtained the HTTP response either from the NF service producer instance 604-1 in step 710 or from cache, the SCP 606 returns the HTTP response to the NF service consumer 602 (step 714). Optionally, if caching is implemented at the NF service consumer 602, the NF service consumer 602 adds the HTTP response to the associated cache system using the ck query parameter (set to the value associated with the NF service producer instance 604-1).

Optionally, similar steps may additionally or alternatively be performed with respect to the NF service producer instance 604-2 (steps 718 through 734). However, in this case, the ck query parameter in the HTTP GET request of step 720 is set to a value (referred to here as "value2") that is linked to the NF service producer instance 604-2 and is different than that used for the ck query parameter in the HTTP GET request of step 702 (which is linked to the NF service producer instance 604-1). Using these different ck query parameter values, the SCP 606 is able to differentiate the HTTP responses from the different NF service producer instances in its cache system.

FIG. 8

Figure 8:
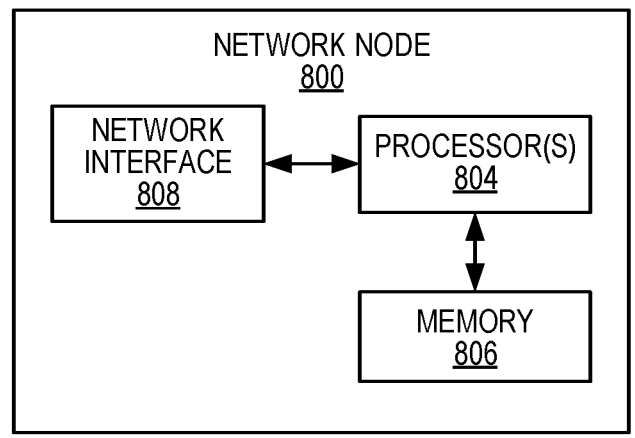
FIG. 8 is a schematic block diagram of a network node according to some embodiments of the present disclosure.

FIG. 8 is a schematic block diagram of a network node 800 according to some embodiments of the present disclosure. The network node 800 is a network node that implements one or more core network functions in accordance with any of the embodiments disclosed herein. For example, the network node 800 may implement a network function such as, e.g., the NF service consumer 602 or the NF service producer instance 604-1 or 604-2 of FIGS. 6 and 7-7B. As illustrated, the network node 800 includes one or more processors 802 (e.g., Central Processing Unit (CPUs), Application Specific Integrated Circuits (ASICs), Field Programmable Gate Arrays (FPGAs), and/or the like), memory 804, and a network interface 806. The one or more processors 802 are also referred to herein as processing circuitry. The one or more processors 802 operate to provide one or more functions of core network function as described herein. In some embodiments, the function(s) are implemented in software that is stored, e.g., in the memory 804 and executed by the one or more processors 802.

FIG. 9

Figure 9:
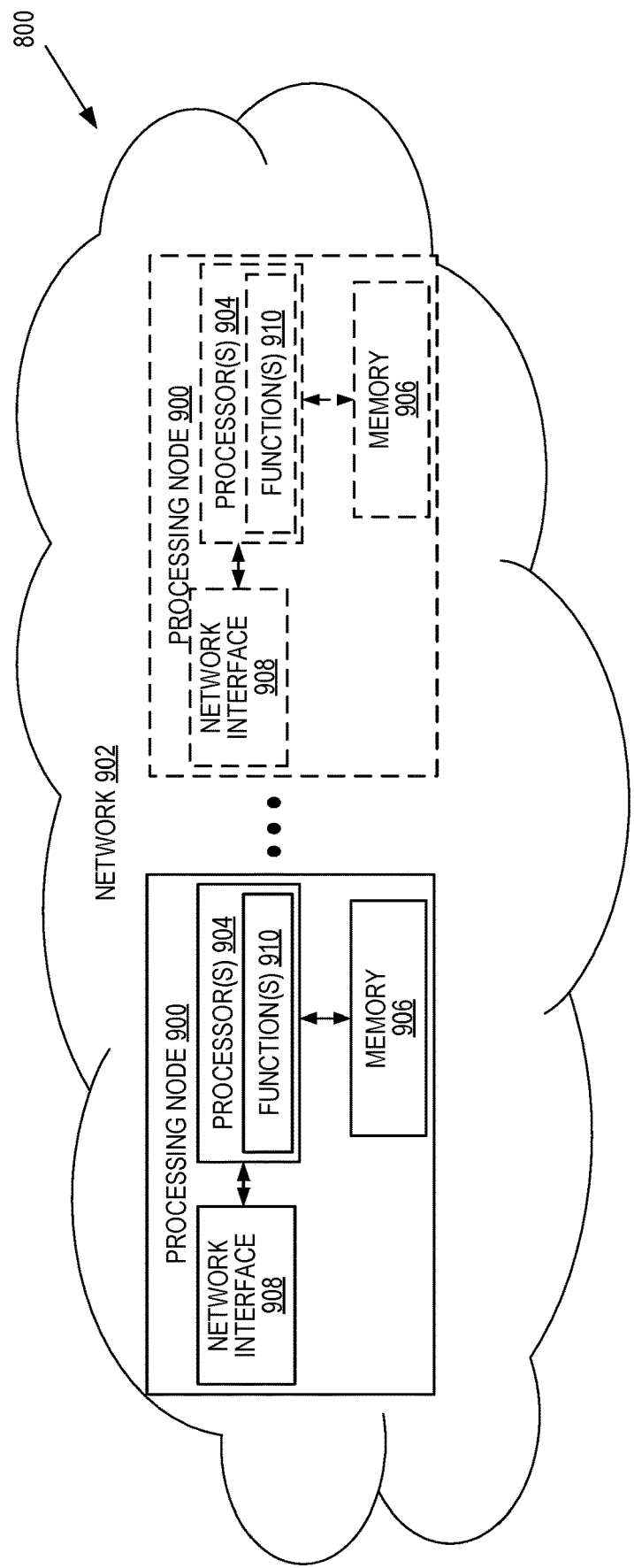
FIG. 9 is a schematic block diagram that illustrates a virtualized embodiment of the network node of FIG. 8 according to some embodiments of the present disclosure.

FIG. 9 is a schematic block diagram that illustrates a virtualized embodiment of the network node 800 according to some embodiments of the present disclosure. As used herein, a "virtualized" network node is an implementation of the network node 800 in which at least a portion of the functionality of the network node 800 is implemented as a virtual component(s) (e.g., via a virtual machine(s) executing on a physical processing node(s) in a network(s)). As illustrated, in this example, the network node 800 includes one or more processing nodes 900 coupled to or included as part of a network(s) 902 via the network interface 808. Each processing node 900 includes one or more processors 904 (e.g., CPUs, ASICs, FPGAs, and/or the like), memory 906, and a network interface 908.

In this example, functions 910 of the network node 800 (e.g., the functions of the core network function(s)) described herein such as, e.g., the functions of the NF service consumer 602 or the NF service producer instance 604-1 or 604-2 of FIGS. 6 and 7A-7B) are implemented at the one or more processing nodes 900 or distributed across the one or more processing nodes 900 in any desired manner. In some particular embodiments, some or all of the functions 910 of the network node 800 described herein are implemented as virtual components executed by one or more virtual machines implemented in a virtual environment(s) hosted by the processing node(s) 900.

In some embodiments, a computer program including instructions which, when executed by at least one processor, causes the at least one processor to carry out the functionality of network node 800 or a node (e.g., a processing node 900) implementing one or more of the functions 910 of the network node 800 in a virtual environment according to any of the embodiments described herein is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

FIG. 10

Figure 10:
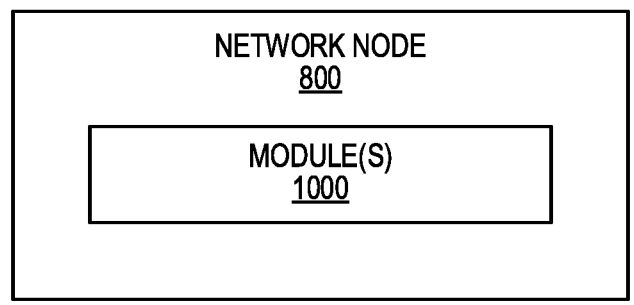
FIG. 10 is a schematic block diagram of the network node of FIG. 8 according to some other embodiments of the present disclosure.

FIG. 10 is a schematic block diagram of the network node 800 according to some other embodiments of the present disclosure. The network node 800 includes one or more modules 1000, each of which is implemented in software. The module(s) 1000 provide the functionality of the network node 800 described herein and, in particular, the functionality of the core network function(s) described herein (e.g., the functionality of the NF service consumer 602 or the NF service producer instance 604-1 or 604-2 of FIGS. 6 and 7A-7B).

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include Digital Signal Processors (DSPs), special-purpose digital logic, and the like. The processing circuitry may be configured to execute program code stored in memory, which may include one or several types of memory such as Read Only Memory (ROM), Random Access Memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

Once example implementation of at least some aspects of the embodiments disclosed herein as a Change Request (CR) to 3GPP Technical Specification (TS) 29.500 V16.1.0 is as follows.

---

\* \* \* First Change \* \* \* \*

6.10.2  Routing Mechanism with SCP (when using TLS between NFs and SCP)

6.10.2.3  Pseudo-header setting

For Indirect Communication with or without delegated discovery, when sending a request to the SCP, the HTTP client shall set the pseudo-headers as follows:
- ":scheme" set to "https";
- ":authority" set to the FQDN or IP address of the SCP; for HTTP requests for which an HTTP client may cache responses (e.g. GET request), the HTTP client should set the :authority to an FQDN of the SCP having the form "<Label representing the target FQDN>.<FQDN of the SCP>", where the first label does not need to be understood by the SCP and only serves for caching the response with a URI uniquely identifying the target NF service instance.

NOTE: the authority (including the label representing the target FQDN) is not forwarded by the SCP to the HTTP server. How the label representing the target FQDN is constructed by the HTTP client is implementation specific.

- ":path" including:
  - the path and query components of the target URI as specified in clause 6.1.4; and
  - the nf-disc-factors query parameter, if delegated discovery is used and has not been performed yet by the SCP (see clause 6.10.2), or if indirect communication without delegated discovery is used and the NF service consumer has selected the producer NF set or NF Service Set (see clause 6.10.x).

The HTTP client shall include the apiRoot of an authority server for the target resource, if available, in the 3gpp-Sbi-Target-apiRoot header (see clause 6.10.2.x).

When forwarding a request to the HTTP server, the SCP shall set the pseudo-headers as specified in clause 6.1, with the following additions:
- the SCP shall modify the ":authority" HTTP/2 pseudo-header field to the FQDN or IP address of the target NF service instance. If the 3gpp-Sbi-Target-apiRoot header was received in the request, the SCP shall set the apiRoot of the request URI to the apiRoot received in the 3gpp-Sbi-Target-apiRoot header from the client, if the SCP does not (re)select a different HTTP server.

\* \* \* Next Change \* \* \* \*

6.10.2.x  3gpp-Sbi-Target-apiRoot header setting

For Indirect Communication with or without delegated discovery, the HTTP client shall include a 3gpp-Sbi-Target-apiRoot header set to the apiRoot of an authority server for the target resource, if available, in requests it sends to the SCP. In particular:
- for Indirect Communication without Delegated Discovery, a service request sent to the SCP to create a resource shall include a 3gpp-Sbi-Target-apiRoot header set to the apiRoot of the selected NF Service Producer, if the NF Service Consumer has selected a specific NF service instance;
- after a resource has been created, subsequent service requests sent to the SCP and targeting the resource shall include a 3gpp-Sbi-Target-apiRoot header set to the apiRoot received earlier from the NF Service Producer;
- notifications or callbacks sent via the SCP shall include the apiRoot of the notification or callback URI.

When forwarding the request to the HTTP server, the SCP shall:
- remove the 3gpp-Sbi-Target-apiRoot header; and
- set the apiRoot of the request URI to the apiRoot received in the 3gpp-Sbi-Target-apiRoot header from the client, if the SCP does not (re)select a different HTTP server.

\* \* \* End of Changes \* \* \* \*

---

Some of the embodiments that are described above can be summarized in the following manner:

1. A method for indirect communication in a core network of a wireless communication system using a Service Communication Proxy (SCP) 606 with Transport Layer Security (TLS), the method comprising:

at a Network Function (NF) service consumer 602:

sending 702 to the SCP 606, a Hypertext Transfer Protocol (HTTP) message that is intended for a first NF service producer instance 604-1, the HTTP message using a Fully Qualified Domain Name (FQDN) of the SCP 606 and having a path that includes a query parameter set to a first value;
at the SCP 606:
receiving 702 the HTTP message from the NF service consumer 602;
obtaining a HTTP response for the HTTP message; and
sending 714 the HTTP response to the NR service consumer 602; and
at the NF service consumer 602:
receiving 714 the HTTP response from the SCP 606.

2. The method of embodiment 1 further comprising:
at the SCP 606:
determining 704 whether there is a cache hit for the HTTP message in a cache system of the SCP 606 based, at least on part, on the query parameter;
wherein obtaining the HTTP response at the SCP 606 comprises obtaining the HTTP response for the HTTP message from the cache system when there is a cache hit for the HTTP message in the cache system of the SCP 606, otherwise obtaining the HTTP response for the HTTP message from the first NF service producer instance 604-1.

3. The method of embodiment 1 or 2 further comprising:
at the NF service consumer 602:
prior to sending 702 the HTTP message to the SCP 606, determining 700 whether there is a cache hit for the HTTP message in a cache system of the NF service consumer 602 based, at least in part, on the query parameter;
wherein sending 702 the HTTP message to the SCP 606 comprises sending 702 the HTTP message to the SCP 606 when there is not a cache hit for the HTTP message in the cache system of the NF service consumer 602.

4. A method performed by a Network Function (NF) service consumer 602 for indirect communication in a core network of a wireless communication system using a Service Communication Proxy (SCP) 606 with Transport Layer Security (TLS), the method comprising:
sending 702, to the SCP 606, a Hypertext Transfer Protocol (HTTP), message that is intended for a first NF service producer instance 604-1, the HTTP message using a Fully Qualified Domain Name (FQDN), of the SCP 606 and having a path that includes a query parameter set to a first value; and
receiving 714 an HTTP response from the SCP 606.

5. The method of embodiment 4 wherein sending 702 the HTTP message to the SCP 606 comprises sending 702 the HTTP message to the SCP 606 together with a 3gpp-Sbi-Target-apiRoot set to an apiRoot of the first NF service producer instance 604-1.

6. The method of embodiment 4 or 5 wherein the first value is associated with (e.g., indicates) the first NF service producer instance 604-1.

7. The method of any of embodiments 4 to 6 further comprising:
prior to sending 702 the HTTP message to the SCP 606, determining 700 whether there is a cache hit for the HTTP message in a cache system of the NF service consumer 602 based, at least in part, on the query parameter;
wherein sending 702 the HTTP message to the SCP 606 comprises sending 702 the HTTP message to the SCP 606 when there is not a cache hit for the HTTP message in the cache system of the NF service consumer 602.

8. The method embodiment 7 further comprising caching 716 the HTTP response in the cache system of the NF service consumer 602 using the first value of the query parameter that is associated with the NF service producer instance 604-1.

9. The method of any of embodiment 4 to 8 further comprising sending 720, to the SCP 606, a second HTTP message that is intended for a second NF service producer instance 604-2, the second HTTP message using the FQDN of the SCP 606 and having a path that includes a query parameter set to a second value that is different than the first value.

10. The method of embodiment 9 wherein sending 720 the second HTTP message to the SCP 606 comprises sending 720 the second HTTP message to the SCP 606 together with a 3gpp-Sbi-Target-apiRoot set to an apiRoot of the second NF service producer instance 604-2.

11. The method of embodiment 9 or 10 wherein the second value is associated with (e.g., indicates) the second NF service producer instance 604-2.

12. The method of any of embodiments 4 to 11 wherein the HTTP message is a HTTP GET request, an HTTP POST message, an HTTP PUT message, or an HTTP DELETE message.

13. A method performed by a Service Communication Proxy (SCP) 606 for indirect communication in a core network of a wireless communication system with Transport Layer Security (TLS), the method comprising:
receiving 702, from a Network Function (NF), service consumer 602, a Hypertext Transfer Protocol (HTTP), message that is intended for a first NF service producer instance 604-1, the HTTP message using a Fully Qualified Domain Name (FQDN), of the SCP 606 and having a path that includes a query parameter set to a first value;
obtaining an HTTP response for the HTTP message; and
sending 714 the HTTP response to the NR service consumer 602.

14. The method of embodiment 13 wherein receiving 702 the HTTP message comprises receiving 702 the HTTP message from the NF service consumer 602 together with a 3gpp-Sbi-Target-apiRoot set to an apiRoot of the first NF service producer instance 604-1.

15. The method of embodiment 13 or 14 wherein the first value is associated with (e.g., indicates) the first NF service producer instance 604-1.

16. The method of any of embodiments 13 to 15 further comprising receiving 720, from the NF service consumer 602, a second HTTP message that is intended for a second NF service producer instance 604-2, the second HTTP message using the FQDN of the SCP 606 and having a path that includes a query parameter set to a second value that is different than the first value.

17. The method of embodiment 16 wherein receiving 720 the second HTTP message comprises receiving 720 the second HTTP message from the NF service consumer 602 together with a 3gpp-Sbi-Target-apiRoot set to an apiRoot of the second NF service producer instance 604-2.

18. The method of embodiment 16 or 17 wherein the second value is associated with (e.g., indicates) the second NF service producer instance 604-2.

19. The method of any of embodiment 13 to 18 further comprising:
determining 704 whether there is a cache hit for the HTTP message in a cache system of the SCP 606 based, at least on part, on the query parameter;

wherein obtaining the HTTP response comprises obtaining the HTTP response for the HTTP message from the cache system when there is a cache hit for the HTTP message in the cache system of the SCP 606, otherwise obtaining the HTTP response for the HTTP message from the first NF service producer instance 604-1.

20. The method of embodiment 19 wherein obtaining the HTTP response for the HTTP message from the first NF service producer instance 604-1 comprises:
   sending 708 the HTTP message to the first NF service producer instance 604-1 with or without the query parameter; and
   receiving 710 an HTTP response from the first NF service producer instance 604-1;
   wherein:
      the method further comprises caching 712 the HTTP response in the cache system of the SCP 606 using the first value of the query parameter that is associated with the first NF service producer instance 604-1; and
      sending 714 the HTTP response to the NF service consumer 602 comprises sending 714 the HTTP response received from the first NF service producer instance 604-1 to the NF service consumer 602.

21. The method of embodiment 20 wherein sending 708 the HTTP message to the first NF service producer instance 604-1 comprises sending 708 the HTTP message to the first NF service producer instance 604-1 without the query parameter.

22. The method of any of embodiments 13 to 21 wherein the HTTP message is a HTTP GET request, an HTTP POST message, an HTTP PUT message, or an HTTP DELETE message.

23. A network node 800 that implements a Network Function, NF, service consumer 602 for indirect communication in a core network of a wireless communication system using a Service Communication Proxy, SCP, 606 with Transport Layer Security, TLS, the network node 800 adapted to perform the method of any of embodiments 4 to 12.

24. A network node 800 that implements a Service Communication Proxy, SCP, 606 for indirect communication in a core network of a wireless communication system with Transport Layer Security, TLS, the network node 800 adapted to perform the method of any of embodiments 13 to 22.

While processes in the figures may show a particular order of operations performed by certain embodiments of the present disclosure, it should be understood that such order is exemplary (e.g., alternative embodiments may perform the operations in a different order, combine certain operations, overlap certain operations, etc.).

Those skilled in the art will recognize improvements and modifications to the embodiments of the present disclosure. All such improvements and modifications are considered within the scope of the concepts disclosed herein.

What is claimed is:

1. A method for indirect communication in a core network of a wireless communication system using a Service Communication Proxy, SCP, with Transport Layer Security, TLS, the method comprising:
   at a Network Function, NF, service consumer:
      sending, to the SCP, a Hypertext Transfer Protocol, HTTP, message that is intended for a first NF service producer instance, the HTTP message using a Fully Qualified Domain Name, FQDN, of the SCP and having a path that includes a query parameter set to a first value of the first NF service producer instance;
   at the SCP:
      receiving the HTTP message from the NF service consumer;
      obtaining a HTTP response for the HTTP message; and
      sending the HTTP response to the NR service consumer; and
   at the NF service consumer:
      receiving the HTTP response from the SCP.

2. The method of claim 1 further comprising:
   at the SCP:
      determining whether there is a cache hit for the HTTP message in a cache system of the SCP based, at least on part, on the query parameter;
      wherein obtaining the HTTP response at the SCP comprises obtaining the HTTP response for the HTTP message from the cache system when there is a cache hit for the HTTP message in the cache system of the SCP, otherwise obtaining the HTTP response for the HTTP message from the first NF service producer instance.

3. The method of claim 1 further comprising:
   at the NF service consumer:
      prior to sending the HTTP message to the SCP, determining whether there is a cache hit for the HTTP message in a cache system of the NF service consumer based, at least in part, on the query parameter;
      wherein sending the HTTP message to the SCP comprises sending the HTTP message to the SCP when there is not a cache hit for the HTTP message in the cache system of the NF service consumer.

4. A method performed by a Network Function, NF, service consumer for indirect communication in a core network of a wireless communication system using a Service Communication Proxy, SCP, with Transport Layer Security, TLS, the method comprising:
   sending, to the SCP, a Hypertext Transfer Protocol, HTTP, message that is intended for a first NF service producer instance, the HTTP message using a Fully Qualified Domain Name, FQDN, of the SCP and having a path that includes a query parameter set to a first value of the first NF service producer instance; and
   receiving an HTTP response from the SCP.

5. The method of claim 4 wherein sending the HTTP message to the SCP comprises sending the HTTP message to the SCP together with a 3gpp-Sbi-Target-apiRoot set to an apiRoot of the first NF service producer instance.

6. The method of claim 4 further comprising:
   prior to sending the HTTP message to the SCP, determining whether there is a cache hit for the HTTP message in a cache system of the NF service consumer based, at least in part, on the query parameter;
   wherein sending the HTTP message to the SCP comprises sending the HTTP message to the SCP when there is not a cache hit for the HTTP message in the cache system of the NF service consumer.

7. The method of claim 6 further comprising caching the HTTP response in the cache system of the NF service consumer using the first value of the query parameter that is associated with the NF service producer instance.

8. The method of claim 4 further comprising sending, to the SCP, a second HTTP message that is intended for a second NF service producer instance, the second HTTP message using the FQDN of the SCP and having a path that includes a query parameter set to a second value that is different than the first value.

9. The method of claim 8 wherein sending the second HTTP message to the SCP comprises sending the second HTTP message to the SCP together with a 3gpp-Sbi-Target-apiRoot set to an apiRoot of the second NF service producer instance.

10. The method of claim 4 wherein the HTTP message is a HTTP GET request, an HTTP POST message, an HTTP PUT message, or an HTTP DELETE message.

11. A method performed by a Service Communication Proxy, SCP, for indirect communication in a core network of a wireless communication system with Transport Layer Security, TLS, the method comprising:
receiving, from a Network Function, NF, service consumer, a Hypertext Transfer Protocol, HTTP, message that is intended for a first NF service producer instance, the HTTP message using a Fully Qualified Domain Name, FQDN, of the SCP and having a path that includes a query parameter set to a first value of the first NF service producer instance;
obtaining an HTTP response for the HTTP message; and
sending the HTTP response to the NR service consumer.

12. The method of claim 11 wherein receiving the HTTP message comprises receiving the HTTP message from the NF service consumer together with a 3gpp-Sbi-Target-apiRoot set to an apiRoot of the first NF service producer instance.

13. The method of claim 11 further comprising receiving, from the NF service consumer, a second HTTP message that is intended for a second NF service producer instance, the second HTTP message using the FQDN of the SCP and having a path that includes a query parameter set to a second value that is different than the first value.

14. The method of claim 13 wherein receiving the second HTTP message comprises receiving the second HTTP message from the NF service consumer together with a 3gpp-Sbi-Target-apiRoot set to an apiRoot of the second NF service producer instance.

15. The method of claim 11 further comprising:
determining whether there is a cache hit for the HTTP message in a cache system of the SCP based, at least on part, on the query parameter;
wherein obtaining the HTTP response comprises obtaining the HTTP response for the HTTP message from the cache system when there is a cache hit for the HTTP message in the cache system of the SCP, otherwise obtaining the HTTP response for the HTTP message from the first NF service producer instance.

16. The method of claim 15 wherein obtaining the HTTP response for the HTTP message from the first NF service producer instance comprises:

sending the HTTP message to the first NF service producer instance with or without the query parameter; and
receiving an HTTP response from the first NF service producer instance;
wherein:
the method further comprises caching the HTTP response in the cache system of the SCP using the first value of the query parameter that is associated with the first NF service producer instance; and
sending the HTTP response to the NF service consumer comprises sending the HTTP response received from the first NF service producer instance to the NF service consumer.

17. The method of claim 16 wherein sending the HTTP message to the first NF service producer instance comprises sending the HTTP message to the first NF service producer instance without the query parameter.

18. The method of claim 11 wherein the HTTP message is a HTTP GET request, an HTTP POST message, an HTTP PUT message, or an HTTP DELETE message.

19. A network node that implements a Network Function, NF, service consumer for indirect communication in a core network of a wireless communication system using a Service Communication Proxy, SCP, with Transport Layer Security, TLS, the network node adapted to:
send, to the SCP, a Hypertext Transfer Protocol, HTTP, message that is intended for a first NF service producer instance, the HTTP message using a Fully Qualified Domain Name, FQDN, of the SCP and having a path that includes a query parameter set to a first value of the first NF service producer instance; and
receive an HTTP response from the SCP.

20. A network node that implements a Service Communication Proxy, SCP, for indirect communication in a core network of a wireless communication system with Transport Layer Security, TLS, the network node adapted to:
receive, from a Network Function, NF, service consumer, a Hypertext Transfer Protocol, HTTP, message that is intended for a first NF service producer instance, the HTTP message using a Fully Qualified Domain Name, FQDN, of the SCP and having a path that includes a query parameter set to a first value of the first NF service producer instance;
obtain an HTTP response for the HTTP message; and
send the HTTP response to the NR service consumer.

* * * * *

UNITED STATES PATENT AND TRADEMARK OFFICE
CERTIFICATE OF CORRECTION

PATENT NO. : 12,010,186 B2
APPLICATION NO. : 17/765089
DATED : June 11, 2024
INVENTOR(S) : Yang et al.

Page 1 of 1

It is certified that error appears in the above-identified patent and that said Letters Patent is hereby corrected as shown below:

On the Title Page

In Column 1, below item (65), insert Item -- (30) Foreign Application Priority Data
PCT/CN2019/109785 (CN) ............. Oct. 01, 2019 --.

In the Specification

In Column 3, Line 27, delete "Program" and insert -- Programming --, therefor.

In Column 3, Lines 44-45, delete "Access and Mobility Function" and insert -- Access and Mobility Management Function --, therefor.

In Column 4, Lines 22-23, delete "https://labelLscp.operator.com/nudm_sdm/v1/{ supi}/nssai" and insert -- https://label1.scp.operator.com/nudm_sdm/v1/{supi}/nssai --, therefor.

In Column 4, Line 26, delete "https://labelLscp.operator.com/nudm_sdm/v1/{supi}/nssai." and insert -- https://label1.scp.operator.com/nudm_sdm/v1/{supi}/nssai. --, therefor.

In Column 6, Line 43, delete "Access and Mobility Function" and insert -- Access and Mobility Management Function --, therefor.

In Column 6, Line 47, delete "(NF) Repository" and insert -- (NF), a Network Repository --, therefor.

In Column 7, Lines 23-24, delete "Program" and insert -- Programming --, therefor.

In Column 7, Line 43, delete "https://scp.operator.com:8080/The" and insert -- https://scp.operator.com:8080/ --, therefor.

In Column 8, Line 1, delete "Access (E-UTRA) RAN)." and insert -- Access Network (E-UTRAN)). --, therefor.

Signed and Sealed this
Eighteenth Day of February, 2025

Coke Morgan Stewart
*Acting Director of the United States Patent and Trademark Office*